US012327668B2

(12) United States Patent
Frye et al.

(10) Patent No.: US 12,327,668 B2
(45) Date of Patent: Jun. 10, 2025

(54) UNIVERSAL CAP FOR ARRESTER BRACKETS

(71) Applicant: Central Moloney, Inc., White Hall, AR (US)

(72) Inventors: Kevin Frye, Star City, AR (US); Roger Owens, Pine Bluff, AR (US)

(73) Assignee: Central Moloney, Inc., White Hall, AR (US)

( * ) Notice: Subject to any disclaimer, the term of this patent is extended or adjusted under 35 U.S.C. 154(b) by 238 days.

(21) Appl. No.: 18/137,637

(22) Filed: Apr. 21, 2023

(65) Prior Publication Data

US 2024/0355524 A1 Oct. 24, 2024

(51) Int. Cl.
*H01F 27/02* (2006.01)
*H01F 27/40* (2006.01)

(52) U.S. Cl.
CPC ........... *H01F 27/02* (2013.01); *H01F 27/402* (2013.01)

(58) Field of Classification Search
CPC ............................... H01F 27/02; H01F 27/402
USPC ........................................... 361/118; 174/5 R
See application file for complete search history.

(56) References Cited

U.S. PATENT DOCUMENTS 4,991,053 A 2/1991 Cunningham
6,018,453 A 1/2000 Daharsh
6,963,025 B1 11/2005 Kysely
7,009,102 B2 3/2006 Milner
7,772,499 B2 8/2010 Rauckman
8,633,391 B2 * 1/2014 Strong .................... F16B 37/14 174/137 R
9,847,633 B2 * 12/2017 Lenk ....................... H01F 27/02
10,460,858 B2 10/2019 Khatri
2005/0073779 A1 * 4/2005 Milner ................. H01F 27/402 361/38
2013/0112458 A1 5/2013 Gautier

FOREIGN PATENT DOCUMENTS

CN 205911089 U * 1/2017
CN 214044976 8/2021
CN 214044976 U * 8/2021
CN 214624612 11/2021

* cited by examiner

*Primary Examiner* — Thienvu V Tran
*Assistant Examiner* — Sreeya Sreevatsa
(74) *Attorney, Agent, or Firm* — Richard Blakely Glasgow

(57) ABSTRACT

A universal insulating cap for both standard-style and new-style arrester brackets is disclosed. The insulating cap has a slotted portion sized to receive a rib of an arrester bracket so that the cap may be affixed to the rib by sliding the cap over the rib. A cover portion of the cap extends forward from a slotted portion and is sized to at least partially cover a bolt or fastener that connects the arrester bracket to a mounting bracket affixed to a transformer tank. Projecting members extend from the inner walls of the cover portion and contact the sides of the standard-style arrester bracket to aid in holding the cap in place. The space between the projecting members is sized to receive a rib of the new-style arrester bracket to aid in holding the cap in place.

11 Claims, 9 Drawing Sheets

UNIVERSAL CAP FOR ARRESTER BRACKETS

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

This invention relates to caps for electrical equipment and, more particularly, to insulating covers to prevent or reduce power interruptions on distribution utility lines caused when wildlife bridge high voltage circuits.

Power quality has become an important issue with utility companies as customers increasingly demand uninterrupted power feeding their establishments. One of the leading causes of power interruptions on distribution utility lines is bridging of high voltage circuits by wildlife. Birds and squirrels are the most frequent offenders. To reduce the outages associated with wildlife perching or sitting on distribution transformers, molded covers of various styles, made of insulating materials, are used on the high voltage connections to prevent the animals from making contact with these connections.

Many transformers have lightning arresters mounted to the side of the transformer tanks. These arresters typically mount to a metal bracket that is bolted to the transformer tank. Although these arresters typically employ a small wildlife cover, it is generally not effective in preventing wildlife from making contact with the energized parts. A common cause of outages is wildlife perching near the arrester bracket and mounting bracket at ground potential and making contact with the high voltage connection on the arrester. The animal, being electrically conductive, initiates a high current electrical arc to the arrester bracket. This typically results in operation of high current protective devices, such as fuses, which disconnect the transformer from the circuit, thereby interrupting power to the customers being fed from this transformer. Often the heat of the electrical arc damages the transformer and or the arrester. The power to the customer is not restored until a service lineman becomes available to replace the damaged equipment.

To prevent these types of outages, utilities have attempted to insulate the mounting point of these arresters so that animals perching in this area are effectively insulated from ground potential to prevent current flow when they make contact with the high voltage connection on the arrester. Utilities have tried using things such as tape, insulating putty, and molded bolt caps in an attempt to insulate this perching point. None have proven truly effective over the long term.

U.S. Pat. No. 7,009,102 to Milner, which issued on Mar. 7, 2006 and is owned by the Applicant, describes an insulating cap for what has long been considered the standard-style arrester bracket. However, in recent years, a new arrester bracket that is significantly shorter in both height and width has been developed by a transformer manufacturer. It would therefore be desirable to develop a universal insulating cap that fits both the standard-style arrester bracket and the new-style arrester bracket.

BRIEF SUMMARY OF THE INVENTION

The present invention is directed to a universal insulating cap for both standard-style and new-style arrester brackets. The insulating cap has a slotted portion sized to receive a rib of an arrester bracket so that the cap may be affixed to the rib by sliding the cap over the rib. A cover portion of the cap extends forward from a slotted portion and is sized to at least partially cover a bolt or fastener that connects the arrester bracket to a mounting bracket affixed to a transformer tank.

Projecting members extend from the inner walls of the cover portion and contact the sides of the standard-style arrester bracket to aid in holding the cap in place. The space between the projecting members is sized to receive a rib of the new-style arrester bracket to aid in holding the cap in place.

These and other features, objects and advantages of the present invention will become better understood from a consideration of the following detailed description of the preferred embodiments and appended claims in conjunction with the drawings as described following:

DETAILED DESCRIPTION OF THE INVENTION

Figure 1:
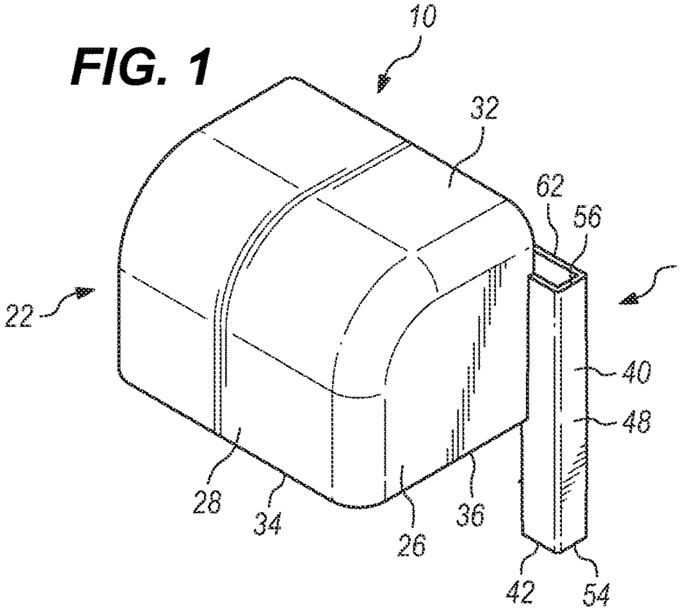
FIG. 1 is a top perspective view of the first embodiment of the universal cap of the present invention.

With reference to FIGS. 1-19, the preferred embodiments of the cap 10 of the present invention may be described. As shown in FIG. 9, the cap 10 is used to cover a fastener 12 that affixes an arrester bracket 14 having ribs 16 to a mounting bracket 18, which is in turn affixed to a transformer tank 20.

The cap 10 has a front, cover portion 22, and a rear, slotted portion 24. The cap 10 may be made from any number of different materials but is preferably made from an insulating material. The material is preferably plastic, is more preferably a polypropylene copolymer, and is most preferably a premium grade, track resistant, UV stabilized polypropylene copolymer. The cover portion 22 has substantially vertical side faces 26, substantially vertical front 28 and rear faces 30, and a substantially horizontal upper face 32. Portions of the upper surfaces connecting the front face 28 and side faces 26 to the upper face 32 are curved or rounded. Lower edges 34 and 36 of the front face 28 and side faces 26 are disposed lower than a lower edge 38 of the rear face 30.

The rear, slotted portion 24 is formed integrally with the front, cover portion 22 and has two substantially identical side portions 40. Front faces 42 of the side portions 40 are connected by the cover portion 22, and rear faces 44 of the side portions 40 are connected by an upper, cross member 46. Because the two side portions 40 are substantially identical, only one side portion 40 will be described in detail. Each side portion 40 has a front face 42, a side face 48, and a rear face 44 that define a slot 50. The slot 50 is sized to accept and slide over and onto a rib 16 of an arrester bracket 14. The front face 42 of the slotted portion 24 is substantially vertical and is aligned with the rear face 30 of the cover portion 22. An upper edge of the front face 42 of the slotted portion 24 is disposed below the upper face 32 of the cover portion 22 and above the lower edge 38 of the rear face 30 of the cover portion 22. A lower edge 52 of the front face 42 of the slotted portion 24 is disposed lower than the lower edges 34 and 36 of the front face 28 and side faces 26 of the cover portion 22. The front face 42 of the slotted portion 24 is narrower than the rear face 44 of the slotted portion 24.

The side face 48 of the slotted portion 24 is substantially vertical and is disposed outward from the side face 26 of the cover portion 22. The width of the side face 48 of the slotted portion 24 is selected so that the slot 50 will accommodate a rib 16 of an arrester bracket 14. Upper edge 56 and lower edge 54 of the side face 48 of the slotted portion 24 are disposed at the same level as upper and lower edges of the front and rear faces 42 and 44 of the slotted portion 24.

The rear face 44 of the slotted portion 24 is substantially vertical and is substantially parallel to the front face 42 of the slotted portion 24. A tab 60 is disposed at a lower portion of an inner surface of the slotted portion 24. The tab 60 projects in a forward direction, into the slot 50. The tab 60 has a sloped lower surface and a substantially horizontal upper surface. Cross member 46 connects the rear faces 44 of the side portions 40. An upper edge 62 of the cross member 46 is aligned with the upper edges of the front, side, and rear faces of the side portions 40. A lower edge 64 of the cross member 46 is aligned with the lower edge 38 of the rear face 30 of the cover portion 22.

Figure 2:
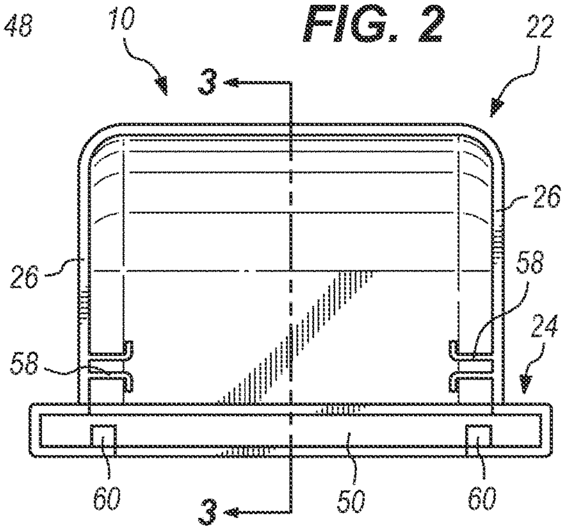
FIG. 2 is a bottom view of the first embodiment of the universal cap of the present invention.
Figure 3:
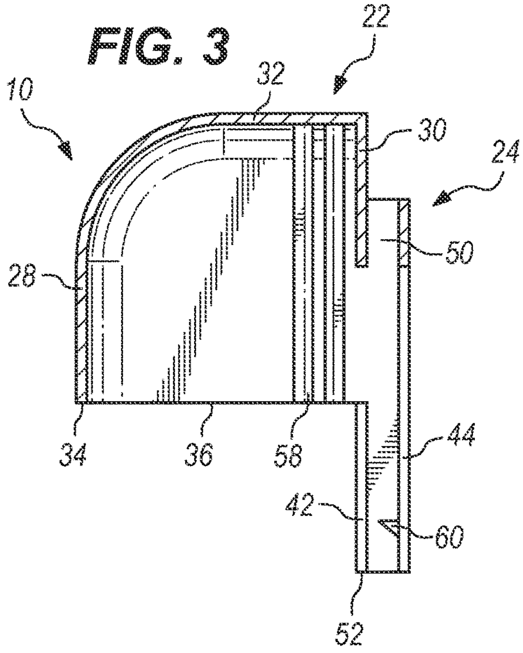
FIG. 3 is a cross-sectional view of the first embodiment of the universal cap of the present invention.
Figure 4:
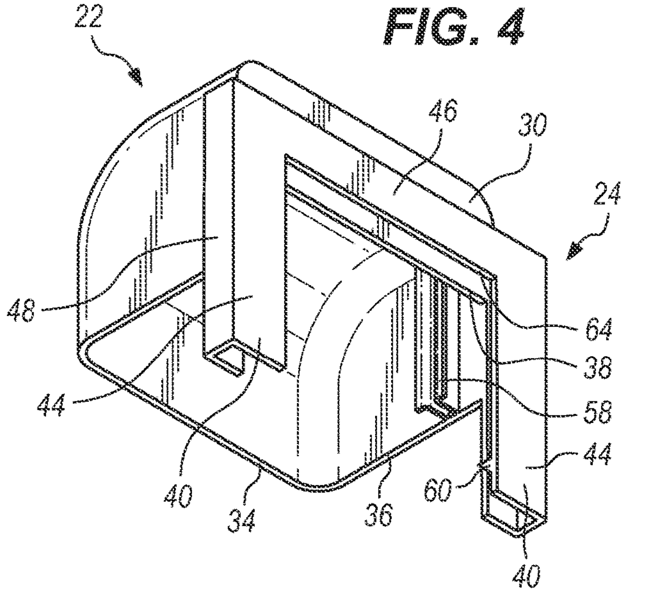
FIG. 4 is a bottom perspective view of the first embodiment of the universal cap of the present invention.
Figure 11:
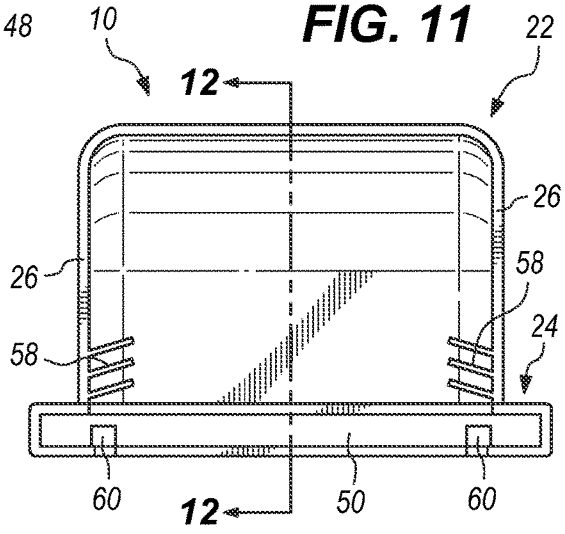
FIG. 11 is a bottom view of the second embodiment of the universal cap of the present invention.
Figure 12:
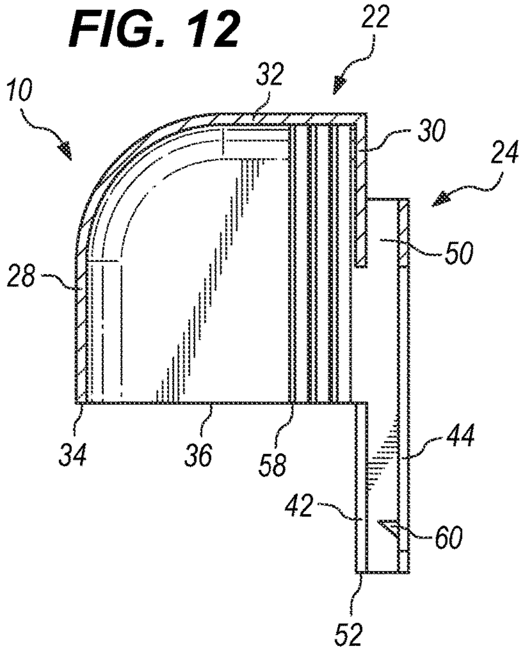
FIG. 12 is a cross-sectional view of the second embodiment of the universal cap of the present invention.
Figure 13:
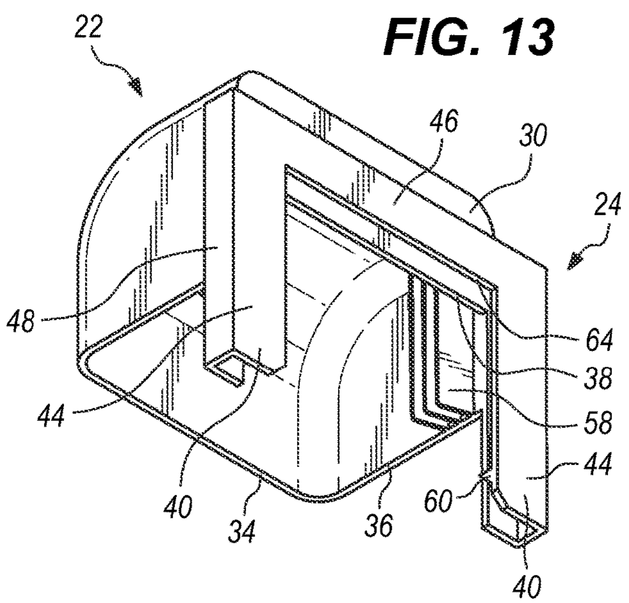
FIG. 13 is a bottom perspective view of the second embodiment of the universal cap of the present invention.

Projecting members 58 extend from the inner surface of the side faces 26 of the cover portion 22 into the interior of the cover portion 22. In one preferred embodiment, there are two groups of two projecting members 58 that face one another, as shown in FIG. 2. The projecting members 58 preferably extend perpendicular (or at least approximately perpendicular) to the inner surface of the side faces 26 of the cover portion 22. At the end of each of the projecting members 58 is a surface that extends approximately parallel to the inner surface of the side faces 26 of the cover portion 22. These two parallel surfaces in each group of projecting members serve as a contact surface with a portion of the sides of the arrester bracket 14, as described in more detail below. In an alternative preferred embodiment, there are two groups of three projecting members 58 that face one another, as shown in FIG. 11. The projecting members 58 preferably are slightly angled from the inner surface of the side faces 26 of the cover portion 22 towards the inner surface of the front face 28 of the cover portion 22. The ends of the projecting members 58 serve as contact surfaces for a portion of the sides of the arrester bracket 14, as described in more detail below.

The cap 10 of the present invention is particularly useful when it is used to cover a fastener 12, such as a bolt, that affixes an arrester bracket 14 having ribs 16 to a mounting bracket 18, which is in turn affixed to a transformer tank 20. In operation, a user positions the cap 10 above an arrester bracket 14 and aligns the slotted portion 24 of the cap 10 with a rib 16 of the arrester bracket 14. The user pushes the cap 10 downward so that the slotted portion 24 engages and slides along edges of the rib 16.

Figure 5:
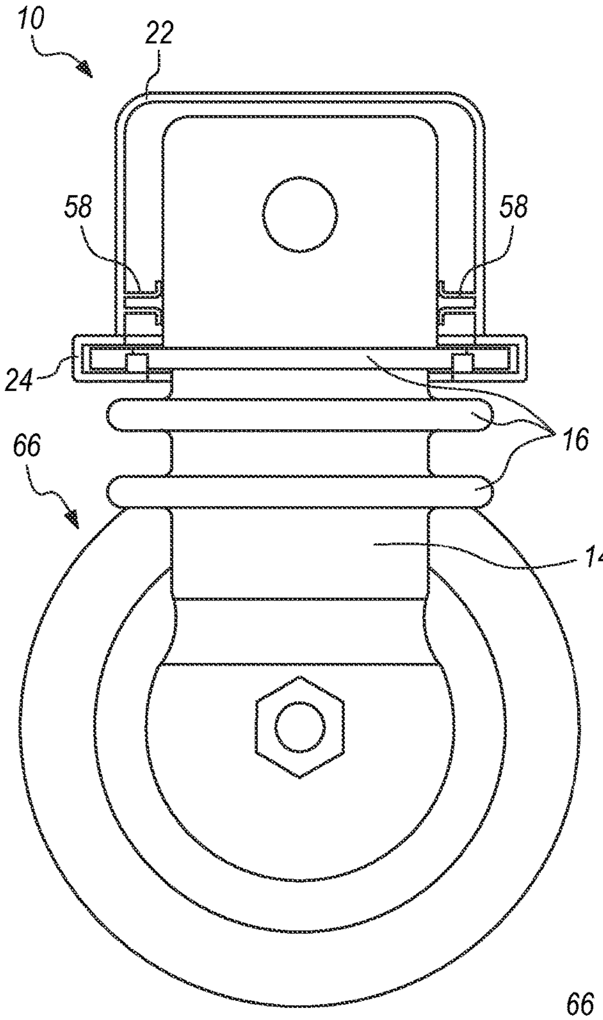
FIG. 5 is a bottom view of the first embodiment of the universal cap of the present invention on a standard-style arrester bracket.
Figure 6:
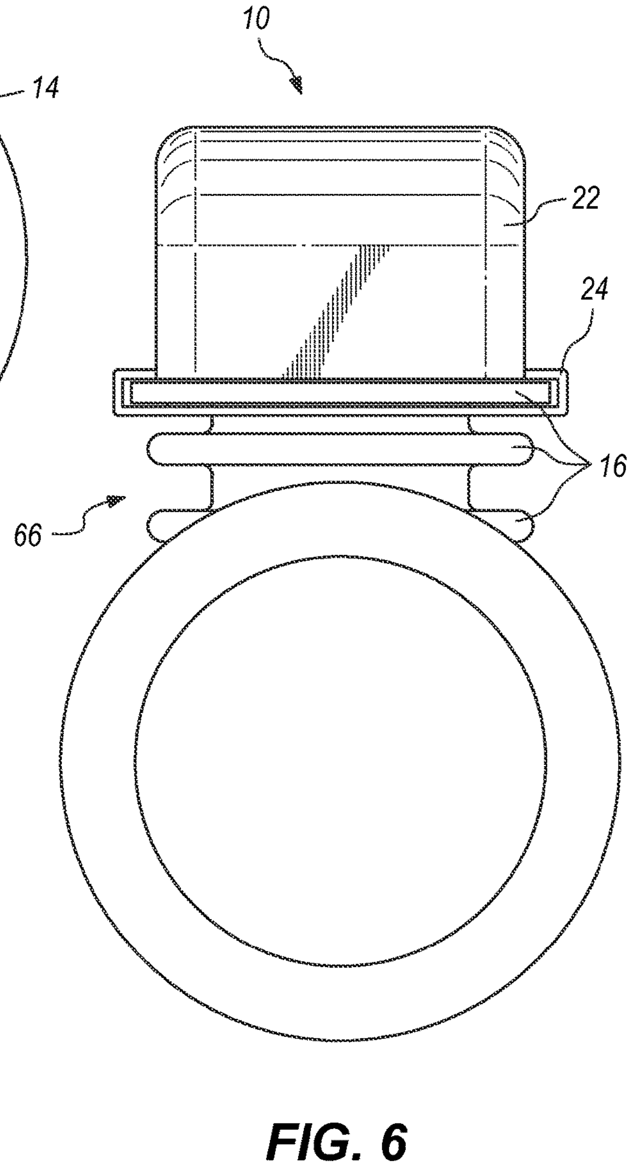
FIG. 6 is a top view of the first embodiment of the universal cap of the present invention on a standard-style arrester bracket.
Figure 7:
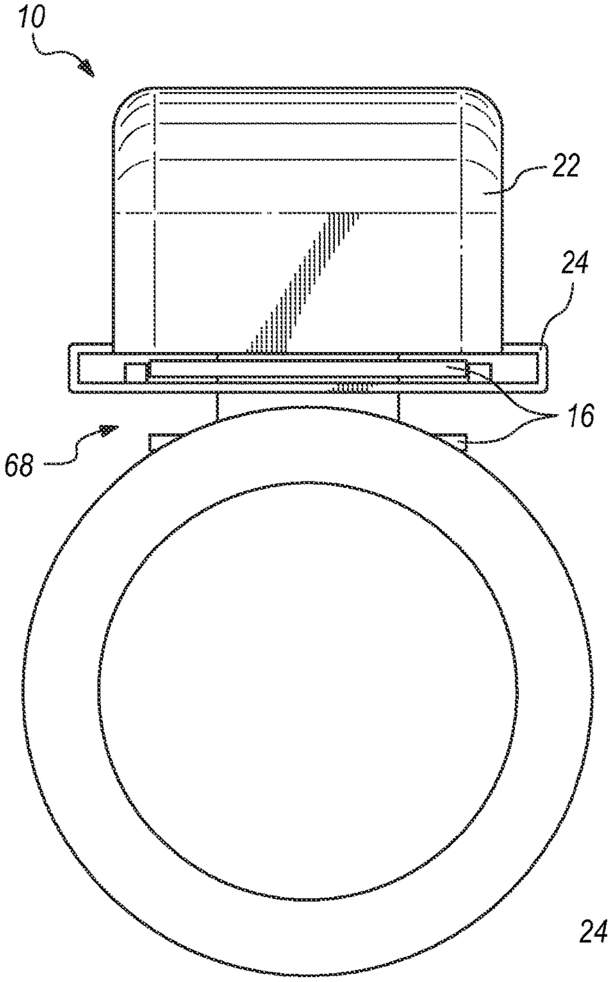
FIG. 7 is a top view of the first embodiment of the universal cap of the present invention on a new-style arrester bracket.
Figure 14:
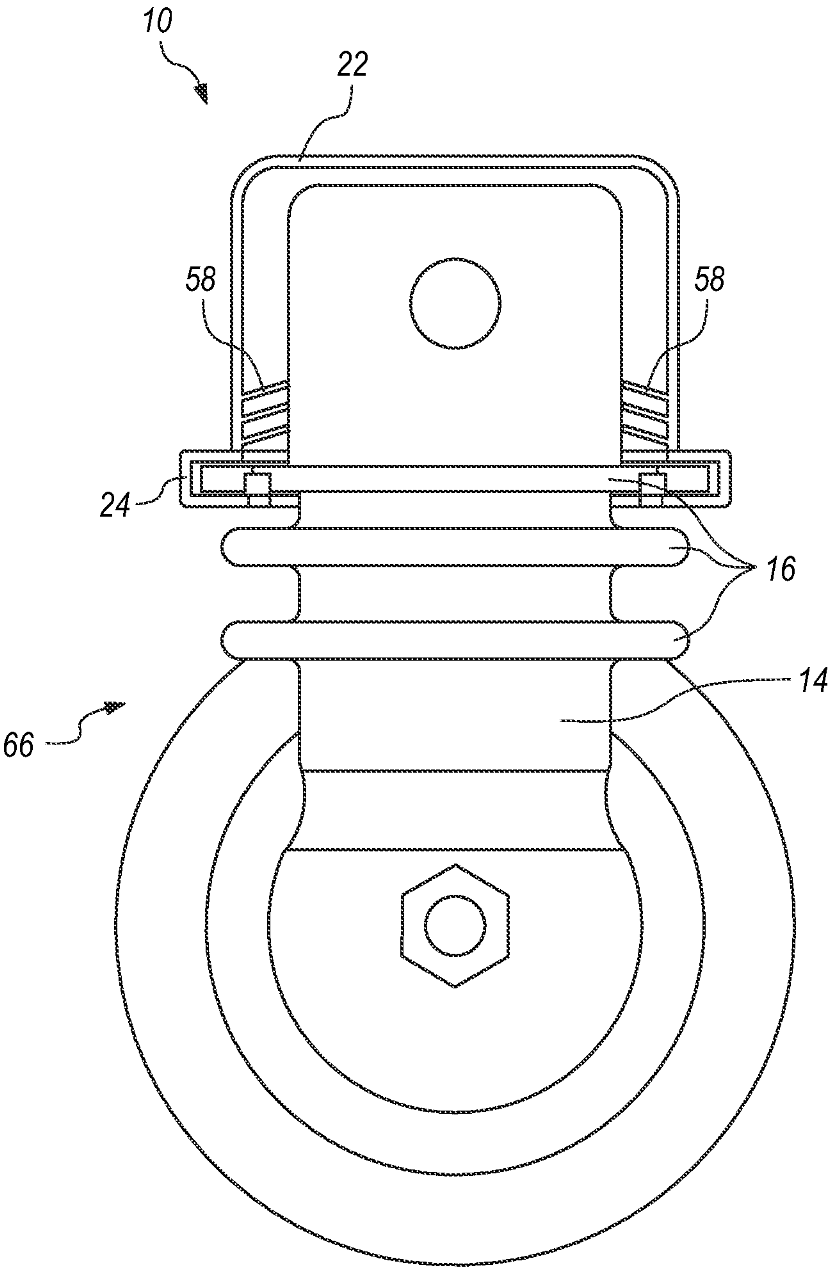
FIG. 14 is a bottom view of the second embodiment of the universal cap of the present invention on a standard-style arrester bracket.
Figure 15:
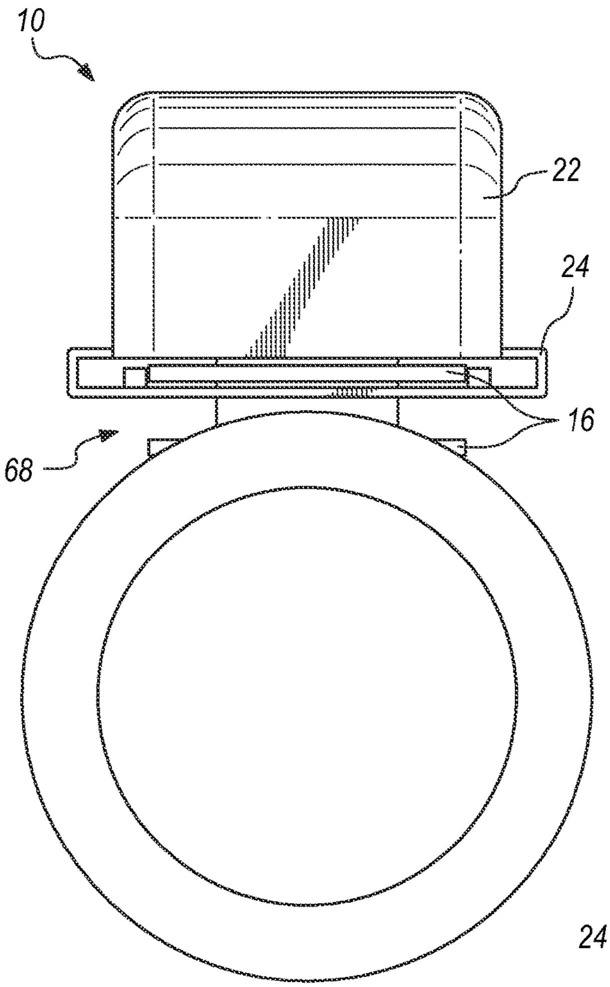
FIG. 15 is a top view of the second embodiment of the universal cap of the present invention on a new-style arrester bracket.

When installing the cap 10 on a standard arrester bracket 66, the slotted portion 24 of the cap is aligned with the rib 16 of the arrester bracket 66 that is closest to the connecting bolt 12, and the cap is pushed downward so that the slotted portion 24 engages and slides along the side edges of the rib 16, as shown in FIGS. 5 and 14. As the slotted portion 24 receives the rib 16, the ends of the projecting members 58 contact the side surfaces of the arrester bracket 66 that are adjacent to the connecting bolt 12. The contact between the projecting members 58 and the arrester bracket 66 provides stability for the cap 10. When the tabs 60 move below a lower portion of the rib 16, the tabs 60 are in a locking position to resist removal or upward movement of the cap 10 relative to the rib 16.

Once installed, the lower edge 38 of the rear face 30 of the cover portion 22 rests on the arrester bracket 14 in front of the rib 16, and the lower edge 64 of the cross member 46 rests on the arrester bracket 14 behind the rib 16. The cover portion 22 extends forward from the rib 16 to at least partially cover the connecting bolt 12 and upper portions of the mounting bracket 18. The projecting members 58 contact the side surfaces of the arrester bracket 66 that are adjacent to the connecting bolt 12. The contact between the projecting members 58 and the arrester bracket 66 provides stability for the cap 10 on the arrester bracket. Lower edges 36 and 34 of the side faces 26 and front face 28 of the cover portion 22 are disposed below the connecting bolt 12 and below an upper surface of the arrester bracket 14. The cover portion 22 does not contact the connecting bolt 12 and instead provides air space between the cover portion 22 and the connecting bolt 12. The insulating properties of the cap 10 material, in combination with the air space provided, achieve a high insulating value, such as an insulating value that can reach or exceed 21 KV to ground. Once installed, the curved or rounded, smooth upper surfaces of the cover portion 22 deter wildlife from perching on the cap 10. The cover portion 22 also shields high voltage components from contact by wildlife.

To remove the cap 10 from a standard-style arrester bracket 66, the user simply urges the tabs 60 rearward so that they clear the rib 16 and pushes or pulls the cap 10 off of the rib 16. No cumbersome latches, tie straps, tape, or tools are needed for installation or removal.

Figure 8:
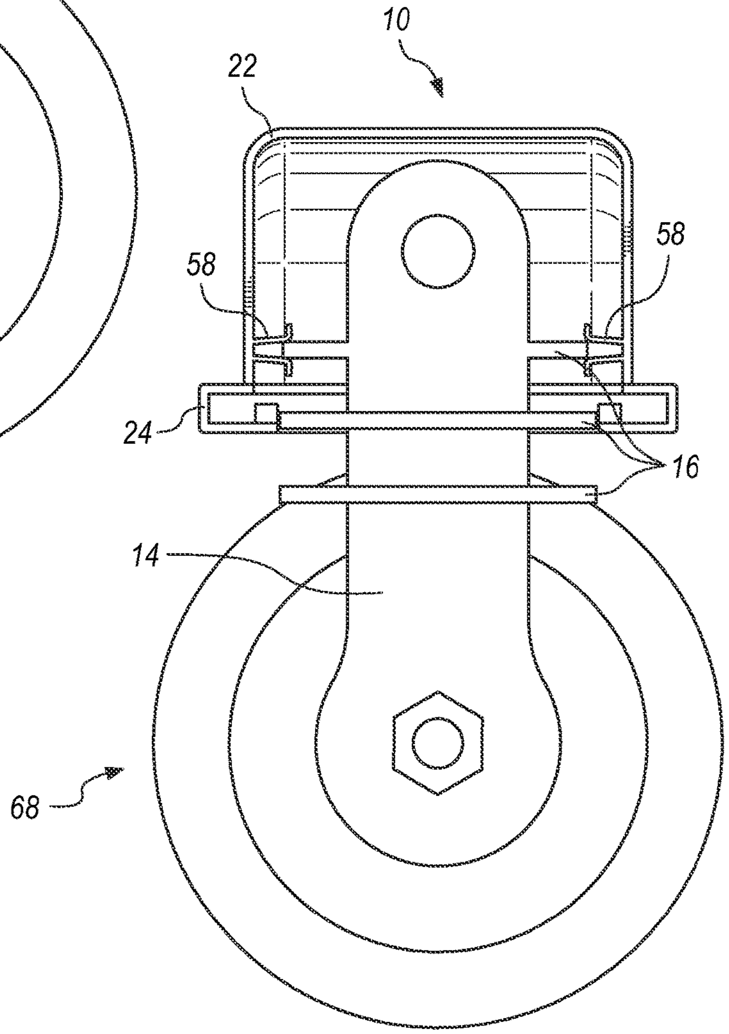
FIG. 8 is a bottom view of the first embodiment of the universal cap of the present invention on a new-style arrester bracket.
Figure 9:
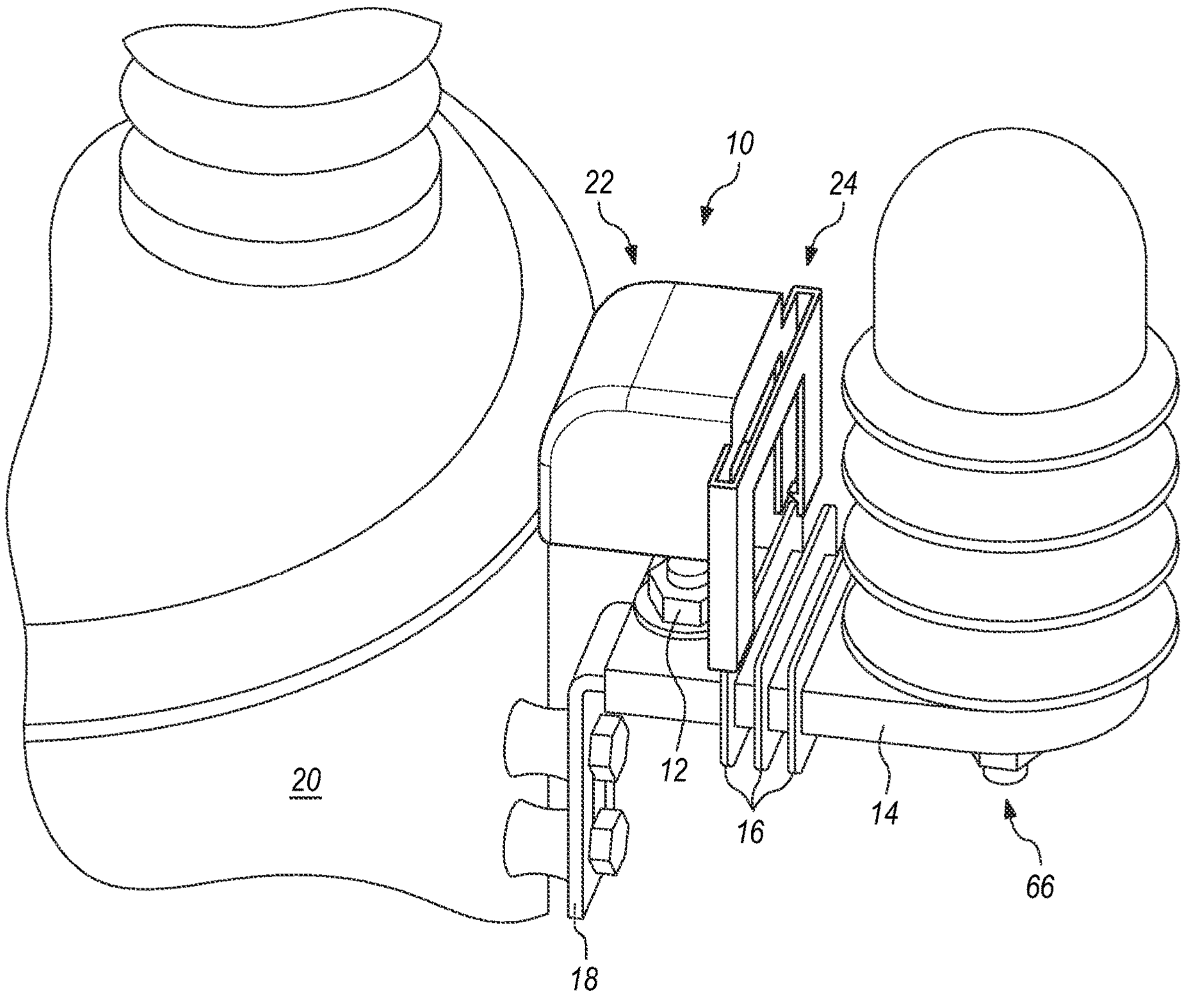
FIG. 9 is a top perspective view of the first embodiment of the universal cap of the present invention as it is being slid onto a rib of a standard-style arrester bracket.
Figure 10:
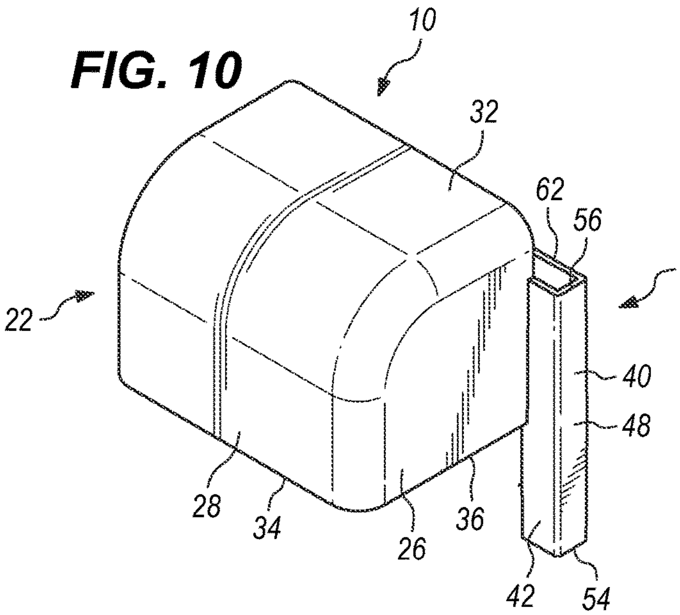
FIG. 10 is a top perspective view of the second embodiment of the universal cap of the present invention.
Figure 16:
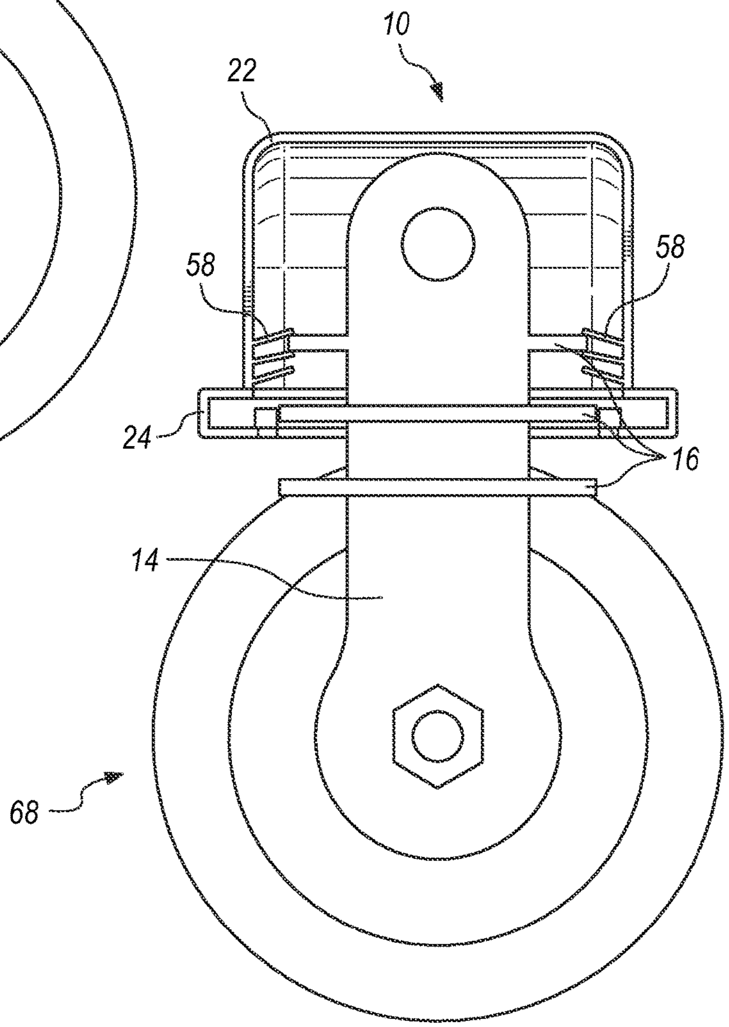
FIG. 16 is a bottom view of the second embodiment of the universal cap of the present invention on a new-style arrester bracket.
Figure 17:
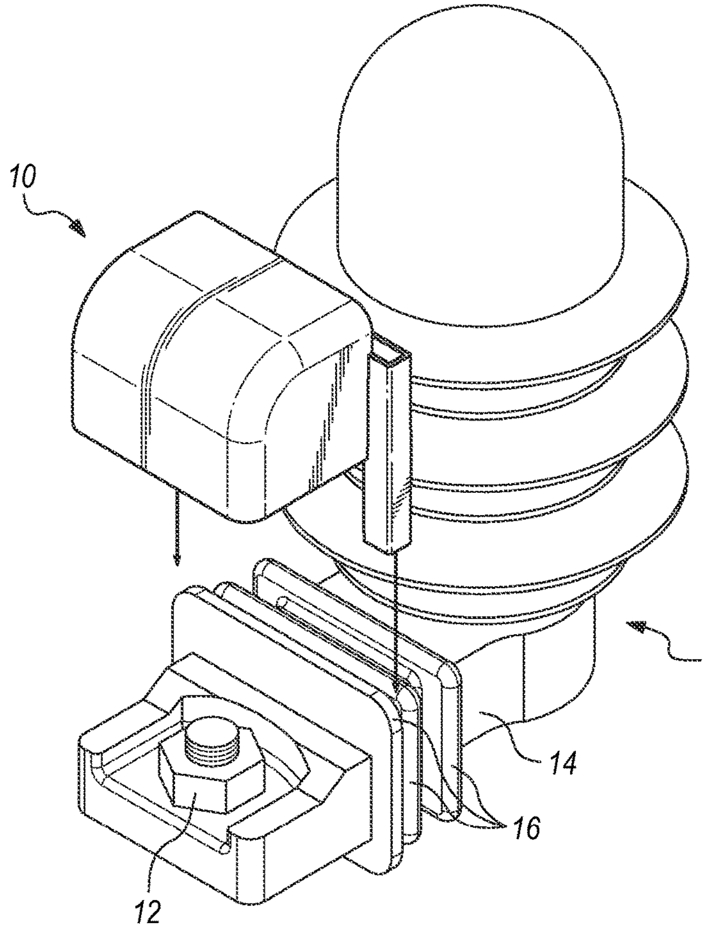
FIG. 17 is a front perspective view of the second embodiment of the universal cap of the present invention as it is being slid onto a rib of a standard-style arrester bracket.
Figure 18:
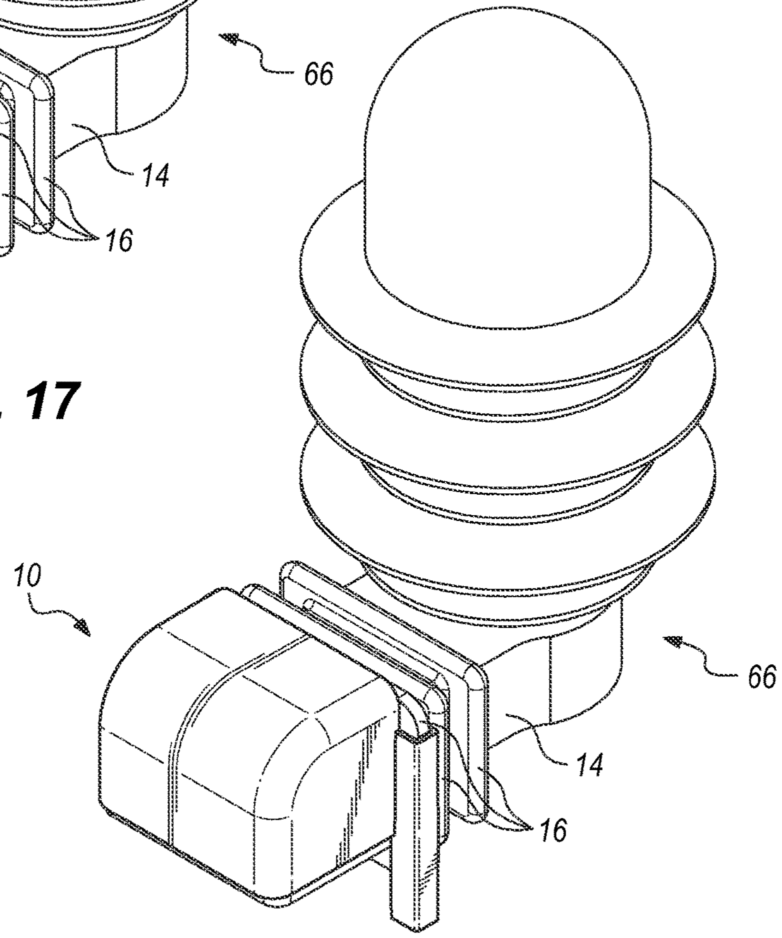
FIG. 18 is a front perspective view of the second embodiment of the universal cap of the present invention positioned on a rib of a standard-style arrester bracket.
Figure 19:
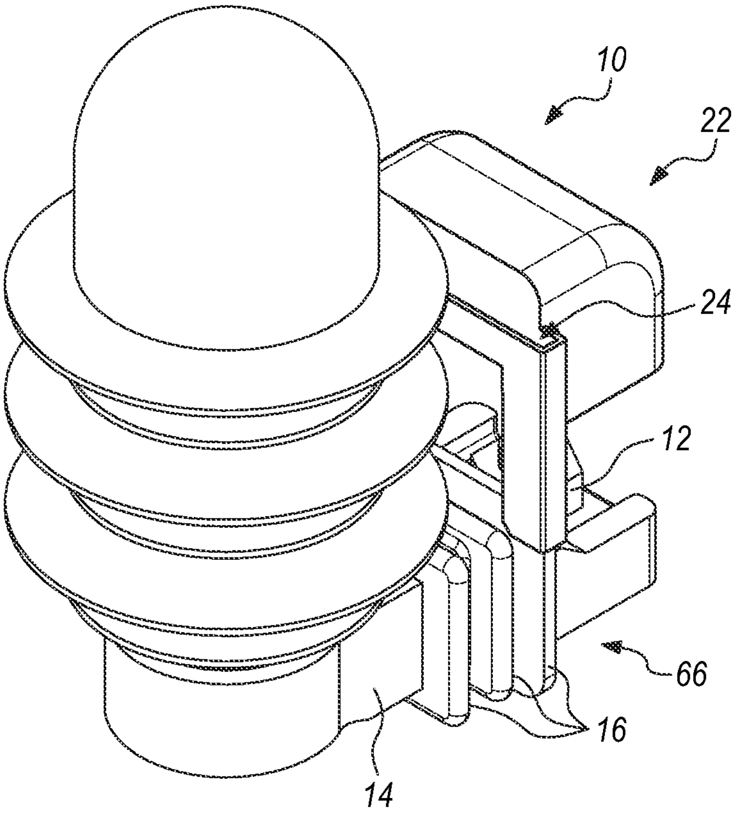
FIG. 19 is a back perspective view of the second embodiment of the universal cap of the present invention as it is being slid onto a rib of a standard-style arrester bracket.

When installing the cap 10 on the new-style arrester bracket 68, the slotted portion 24 of the cap is aligned with the rib 16 of the arrester bracket 68 that is the second closest rib to the connecting bolt 12, and the cap is pushed downward so that the slotted portion 24 engages and slides along the edges of the rib 16, as shown in FIGS. 7-8 and 15-16. As the slotted portion 24 receives the rib 16, the space between two of the projecting members 58 receives the rib 16 that is closest to the connecting bolt 12, as shown in FIGS. 8 and 16.

Once installed, the lower edge 38 of the rear face 30 of the cover portion 22 rests on the arrester bracket 14 in front of the rib 16 second closest to the connecting bolt 12, and the lower edge 64 of the cross member 46 rests on the arrester bracket 14 behind that rib 16. The cover portion 22 extends forward from the second rib 16 to at least partially cover the connecting bolt 12 and upper portions of the mounting bracket 18. The side edges of the rib 16 closest to the connecting bolt 12 are positioned in between two of the projecting members 58. Lower edges 36 and 34 of the side faces 26 and front face 28 of the cover portion 22 are disposed below the connecting bolt 12 and below an upper surface of the arrester bracket 14. The cover portion 22 does not contact the connecting bolt 12 and instead provides air space between the cover portion 22 and the connecting bolt 12. The insulating properties of the cap 10 material, in combination with the air space provided, achieve a high insulating value, such as an insulating value that can reach or exceed 21 KV to ground. Once installed, the curved or rounded, smooth upper surfaces of the cover portion 22 deter wildlife from perching on the cap 10. The cover portion 22 also shields high voltage components from contact by wildlife.

To remove the cap 10 from a new-style arrester bracket, the user simply pushes or pulls the cap 10 off of the ribs 16. No cumbersome latches, tie straps, tape, or tools are needed for installation or removal.

Other modifications, changes and substitutions are intended in the foregoing, and in some instances, some features of the invention will be employed without a corresponding use of other features. For example, the cap 10 may take any number of different sizes, shapes, or configurations. Tabs 60 may or may not be used and, if used, may take any number of different sizes, shapes, or configurations. Similarly, the tabs 60 may be disposed in any number of different locations and, for example, may be disposed on the front or side faces 42, 48 of the side portions 40. The cap 10 may be made from any number of different materials or different combinations of materials. Also, the cover portion 22 and slotted portion 24 may be formed or connected in any number of different manners, for example, with upper, lower, and side surfaces disposed at any number of different heights, widths, and orientations. The cover portion 22 may be sized to cover less or more area. The cap 10 may be used in combination with any number of ribbed components and is not limited to use in connection with arrester brackets 14. Of course, quantitative information is included by way of example only and is not intended as a limitation as to the scope of the invention. Accordingly, it is appropriate that the invention be construed broadly and in a manner consistent with the scope of the invention disclosed.

The present invention has been described with reference to certain preferred and alternative embodiments that are intended to be exemplary only and not limiting to the full scope of the present invention as set forth in the appended claims.

We claim:

1. A cap for an arrester bracket, comprising:

a cover portion having an inner surface and an outer surface, wherein said cover portion is configured to cover a portion of an arrester bracket;

a slotted portion slidable over a rib of said arrester bracket; and a plurality of projecting members extending from said inner surface of said cover portion, wherein said plurality of projecting members are configured to contact said arrester bracket for restricting removal of said cap from said arrester bracket.

2. The cap of claim 1, wherein said plurality of projecting members comprises a first set of projecting members and a second set of projecting members.

3. The cap of claim 2, wherein said first set of projecting members faces said second set of projecting members.

4. The cap of claim 1, wherein some of said plurality of projecting members contact a side of said arrester bracket when said cap is covering said portion of said arrester bracket.

5. The cap of claim 1, wherein a space between two of said plurality of projecting members is configured to received said rib of said arrester bracket.

6. The cap of claim 1, wherein said plurality of projecting members are angled towards a front face of said cover portion.

7. The cap of claim 1, wherein some of said plurality of projecting members extend approximately perpendicular to said inner surface of said cover portion.

8. The cap of claim 7, wherein said some of said plurality of projecting members comprise a surface extending approximately parallel to said inner surface of said cover portion.

9. The cap of claim 1, wherein said slotted portion comprises a first tab and a second tab, wherein said first tab and said second tab are configured to resist removal of said slotted portion from said rib.

10. The cap of claim 1, wherein said cover portion comprises an interior compartment, wherein said plurality of projecting members extend into said interior compartment of said cover portion.

11. A method of installing a cap for an arrester bracket, comprising the steps of:

affixing an arrester bracket to a mounting bracket using a fastener, wherein said arrester bracket comprises a rib; and affixing a cap to said rib so that said cap at least partially covers said fastener and a plurality of projecting members extending from said cap contact said arrester bracket to restrict removal of said cap from said arrester bracket.

* * * * *